(12) United States Patent
Anand et al.

(10) Patent No.: US 8,667,024 B2
(45) Date of Patent: Mar. 4, 2014

(54) SHARED DATA MANAGEMENT IN SOFTWARE-AS-A-SERVICE PLATFORM

(75) Inventors: Rangachari Anand, Teaneck, NJ (US); Stacy F. Hobson, Poughkeepsie, NY (US); Juhnyoung Lee, Yorktown Heights, NY (US); Jeaha Yang, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/051,303

(22) Filed: Mar. 18, 2011

(65) Prior Publication Data

US 2012/0239699 A1 Sep. 20, 2012

(51) Int. Cl.
*G06F 17/30* (2006.01)

(52) U.S. Cl.
USPC .......................................... 707/792

(58) Field of Classification Search
USPC .......................................... 707/792
See application file for complete search history.

(56) References Cited

U.S. PATENT DOCUMENTS

| | | | |
|---|---|---|---|
| 5,550,971 A | 8/1996 | Brunner et al. |
| 5,590,326 A | 12/1996 | Manabe |
| 5,649,102 A | 7/1997 | Yamauchi et al. |
| 5,872,850 A | 2/1999 | Klein et al. |
| 5,966,707 A | 10/1999 | Van Huben et al. |
| 6,064,968 A | 5/2000 | Schanz |
| 6,256,676 B1 | 7/2001 | Taylor et al. |
| 6,327,594 B1 | 12/2001 | Van Huben et al. |
| 6,591,265 B1 | 7/2003 | Erickson et al. |
| 6,738,975 B1 | 5/2004 | Yee et al. |
| 6,779,184 B1 | 8/2004 | Puri et al. |
| 6,993,657 B1 * | 1/2006 | Renner et al. ................. 713/182 |
| 7,114,146 B2 | 9/2006 | Zhang et al. |
| 7,131,057 B1 | 10/2006 | Ferrucci et al. |
| 7,237,225 B2 | 6/2007 | Kompalli et al. |
| 7,293,010 B2 | 11/2007 | Angele et al. |
| 7,305,392 B1 | 12/2007 | Abrams |
| 7,509,326 B2 | 3/2009 | Krabel et al. |
| 7,571,447 B2 | 8/2009 | Ally et al. |
| 7,603,300 B2 | 10/2009 | Haffner et al. |
| 7,617,174 B2 | 11/2009 | Chen et al. |
| 7,620,980 B1 | 11/2009 | Wood et al. |
| 7,631,089 B2 | 12/2009 | Knauerhase et al. |
| 7,647,351 B2 | 1/2010 | Monsarrat |
| 7,725,429 B2 | 5/2010 | Rangadass |

(Continued)

OTHER PUBLICATIONS

Notice of Allowance Mailed on Sep. 13, 2013; Application #13/163,177.*

(Continued)

*Primary Examiner* — Sheree Brown
(74) *Attorney, Agent, or Firm* — Scully, Scott, Murphy & Presser, P.C.; William Stock, Esq.

(57) ABSTRACT

Shared data management in software-as-a-service platform may provide a common object data schema for one or more data objects and one or more data attributes associated with said one or more data objects stored in a master database. A plurality of applications may be enabled to be deployed dynamically on a platform and interoperate by sharing said data values stored in the master database. Data trading is enabled in which applications request permissions to read from or write to, or both, the master database, and in which the requests are mediated by granting or denying permissions.

23 Claims, 13 Drawing Sheets

(56) References Cited

U.S. PATENT DOCUMENTS

| | | | |
|---|---|---|---|
| 7,853,961 | B2 | 12/2010 | Nori et al. |
| 7,895,445 | B1 | 2/2011 | Albanese et al. |
| 8,019,812 | B2 * | 9/2011 | Janedittakarn et al. ........ 709/203 |
| 8,122,055 | B2 * | 2/2012 | Grewal et al. .................. 707/784 |
| 8,468,033 | B2 * | 6/2013 | Gunn ................................ 705/2 |
| 8,543,664 | B2 * | 9/2013 | Zirbel et al. ................... 709/218 |
| 2003/0137539 | A1 | 7/2003 | Dees |
| 2003/0172145 | A1 * | 9/2003 | Nguyen .......................... 709/223 |
| 2004/0059598 | A1 * | 3/2004 | Wellons et al. .................... 705/2 |
| 2005/0055556 | A1 | 3/2005 | Shiu et al. |
| 2006/0069717 | A1 * | 3/2006 | Mamou et al. ................. 709/203 |
| 2006/0259923 | A1 | 11/2006 | Chiu |
| 2006/0287890 | A1 | 12/2006 | Stead |
| 2007/0220035 | A1 | 9/2007 | Misovski |
| 2007/0220588 | A1 | 9/2007 | Panda et al. |
| 2007/0239858 | A1 | 10/2007 | Banerji et al. |
| 2007/0265779 | A1 | 11/2007 | Misovski |
| 2007/0282748 | A1 | 12/2007 | Saint Clair |
| 2008/0059543 | A1 | 3/2008 | Engel |
| 2008/0082539 | A1 | 4/2008 | Doane et al. |
| 2008/0256467 | A1 | 10/2008 | Chu |
| 2008/0256607 | A1 * | 10/2008 | Janedittakarn et al. ............ 726/4 |
| 2009/0049056 | A1 * | 2/2009 | Shutt et al. ....................... 707/10 |
| 2009/0080408 | A1 * | 3/2009 | Natoli et al. ................... 370/351 |
| 2009/0099852 | A1 | 4/2009 | Ouimet |
| 2009/0106434 | A1 * | 4/2009 | Zirbel et al. ................... 709/229 |
| 2009/0307755 | A1 * | 12/2009 | Dvorak et al. ..................... 726/4 |
| 2010/0030623 | A1 | 2/2010 | Guglani |
| 2010/0114814 | A1 | 5/2010 | Monsarrat |
| 2010/0122155 | A1 | 5/2010 | Monsarrat |
| 2010/0145728 | A1 * | 6/2010 | Azancot ............................ 705/3 |
| 2010/0198730 | A1 | 8/2010 | Ahmed et al. |
| 2010/0218167 | A1 | 8/2010 | Turner et al. |
| 2010/0250712 | A1 | 9/2010 | Ellison et al. |
| 2010/0332617 | A1 * | 12/2010 | Goodwin et al. ............. 709/219 |
| 2011/0010759 | A1 | 1/2011 | Adler |
| 2011/0025707 | A1 | 2/2011 | Fujioka |
| 2011/0047597 | A1 | 2/2011 | Mahaffey |
| 2011/0078243 | A1 | 3/2011 | Carpenter |
| 2011/0119088 | A1 * | 5/2011 | Gunn ................................ 705/3 |
| 2012/0046966 | A1 * | 2/2012 | Chang et al. ....................... 705/3 |

OTHER PUBLICATIONS

Casati, et al., Adaptive and Dynamic Service Composition in eFlow, CAiSE '00 Proceedings of the 12th International Conf. on Advanced Information Systems Engineering, 2000.

Gold, et al., Understanding Service-Oriented Software, IEEE Software, vol. 21 Issue 2, Mar. 2004.

Drummond, et al., A Data Broker for Distributed Computing Environments, ICCS '01 Proceedings of the International Conference on Computational Sciences—Part I, 2001.

Modahl, et al., MediaBroker: An Architecture for Pervasive Computing, PERCOM '04 Proceedings of the 2nd IEEE Intntnl Conf. on Pervasive Computing and Communications, 2004.

Mouhib Alnoukari, Applying Adaptive Software Development (ASD) Agile Modeling on Predictive Data Mining Applications: ASD-DM Methodology, Int. Symposium on Info. Tech., 2008.

Cervantes, et al, A Framework for Constructing Adaptive Component-Based Applications: Concepts and Experiences. 7th Symposium on Computer-Based Software Engineering, 2004.

Gui, et al, An Architectural Based Framework for Managing Adaptive Real-time Applications, 35th Euromicro Conference on Software Engineering and Advanced Applications, 2009.

Mena, et al, A Software Retrieval Service Based on Adaptive Knowledge-Driven Agents for Wireless Environments, ACM Transactions on Autonomous & Adaptive Systems, V.1 I.1 2006.

Turner, Turning Software into a Service, Computer, vol. 36 Issue 10, Oct. 2003.

Deep Secure, The Deep-Secure Mail Guard Applies Policy Enforcement and Content Checking to Email, Deep Secure Mail Guard Information and Fact Sheet, 2010.

Loser, et al., Master Data Management for Collaborative Service Processes, International Conference on Service Systems and Service Management, Beijing, China, 2004.

Ullman, Information integration using logical views, Theoretical Computer Science—Special issue on the 6th International Conf. on DB Theory—ICDT, vol. 239 Is. 2, May 2000.

Genesereth, et al., Infomaster: an information integration system, SIGMOD '97 Proceedings of the 1997 ACM SIGMOD international conference on Management of data, 1997.

Arens, et al., Query reformulation for dynamic information integration, Journal of Intelligent Information Systems, vol. 6 Issue 2-3, Jun. 1996.

Themistocleous, et al., ERP and application integration: Exploratory survey, AMCIS 2001 proceedings.

Lee, et al., Enterprise integration with ERP and EAI, Communications of the ACM, vol. 46 Issue 2, Feb. 2003.

Zeng, et al., QoS-aware middleware for Web services composition, IEEE Transactions on Software Engineering, vol. 30 Issue 5, May 2004.

Zeng, Quality driven web services composition, WWW '03 Proceedings of the 12th international conference on World Wide Web, 2003.

Milanovic, Current Solutions for Web Service Composition, IEEE Internet Computing, vol. 8 Issue 6, Nov. 2004.

Benatallah, et al., The Self-Serv environment for Web services composition, IEEE Internet Computing, vol. 7, Issue 1, Jan/Feb 2003.

Loshin, David, Master Data Management, Elsevier, 2009.

Berson, Alex et al., Master Data Management and Customer Data Integration for a Global Enterprise, McGraw Hill, 2007.

Dreibelbis, Allen et al., Enterprise Master Data Management: An SOA Approach to Managing Core Information, IBM Press, 2008.

International Search Report mailed Jun. 7, 2012 in related International Application No. PCT/US2012/025841.

* cited by examiner

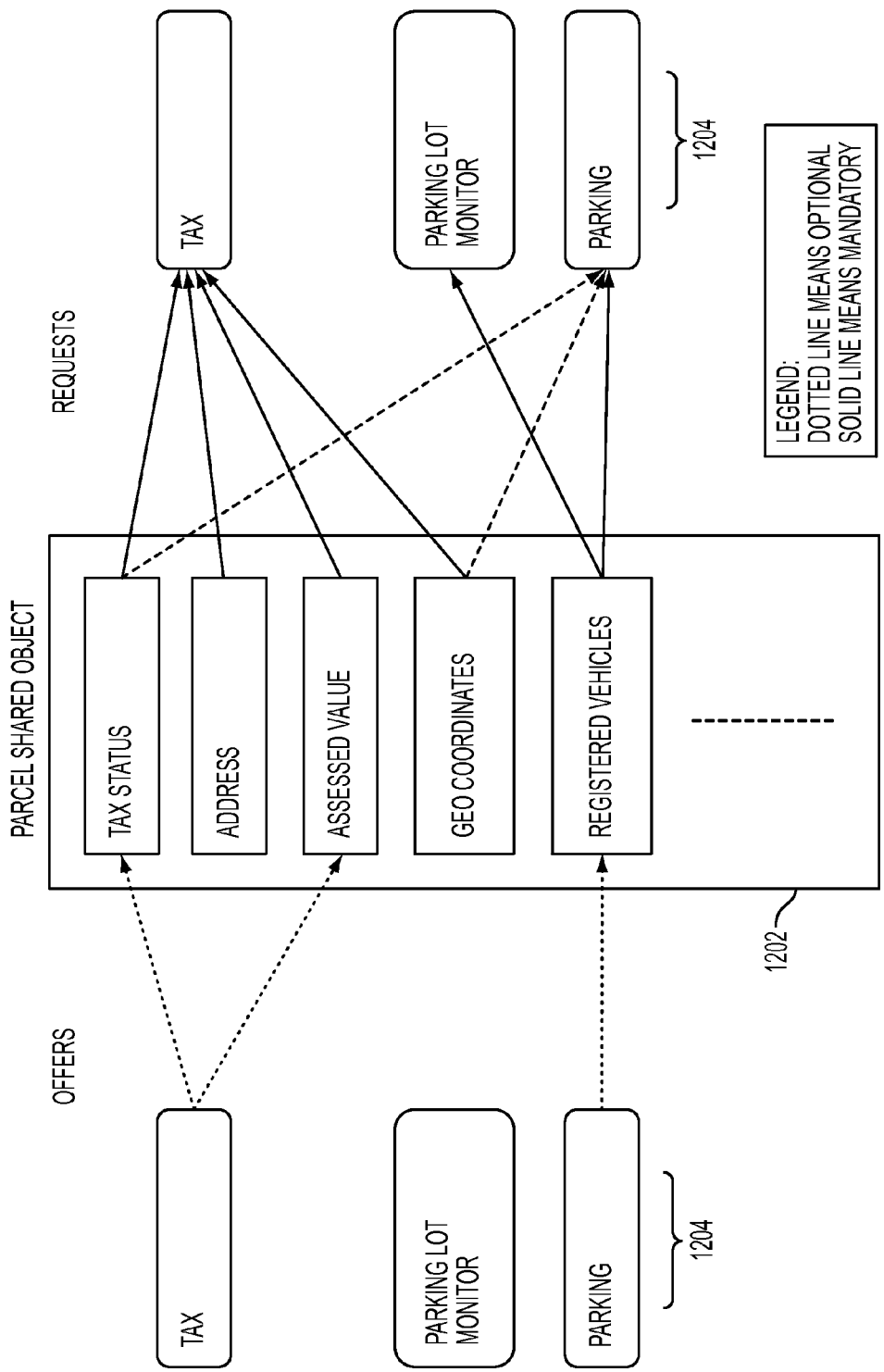

SHARED DATA MANAGEMENT IN SOFTWARE-AS-A-SERVICE PLATFORM

FIELD

The present application relates generally to computers and applications, and more particularly to enabling and managing data sharing in software-as-a-service platform.

BACKGROUND

In many entities still, in-house IT applications are poorly integrated, for example, with disparate applications running on their own, even when there are commonalities in the data those applications use. In such cases, data updated by one application is usually imported to another application manually. For instance, an IT administrator may have to manually access data updated or used by one application and load on to another application.

Take for example, local or municipal government's IT applications used to support service delivery for the municipalities. Those applications typically aligned directly to the departmental structure, with application(s) covering only the tasks associated with a single department. However, services offered and provided to citizens often involve the work of many departments. Consider, for example, a parcel that has been recently renovated by its owners. The parcel owner applies for a building permit from the Building department. After the work has been completed and the Certificate of Occupancy has been issued, the Assessor's office must update the parcel details to reflect the renovations and initiate a parcel reassessment. The newly assessed value has to be updated in the tax system for calculation of the property tax liability. Finally, the property tax payments collected by the tax department are directly entered into the tax system, and must later be updated in and reconciled with the accounts of the Finance department's General Ledger. This example describes the complex interactions between four departments as part of the administration for parcel management services including the renovations, assessment and property tax processes.

In many cases, the departments all use distinct, nonintegrated, custom software programs to aid in their work. Additionally, departments may also use paper-based records and manual record-keeping. Municipalities may choose to pay for pair-wise integration between software applications or purchase pre-integrated software packages, especially for departments that share information frequently. Departments such as Police and Justice, Assessment and Tax, Personnel and Finance rely heavily on the sharing of information that is central to their work. The Police department may need to notify the Justice department of arrest and investigation details as input to current and future court cases. The Assessment department may need to periodically give the Tax department the tax roll, a listing of all taxable parcels, their current assessment values, and valid exemptions. The Personnel department (and/or individual departments) maintains information on employee pay rates, raises, benefits, and work hours. These factors are used to calculate semi-monthly pay to produce payroll checks.

Although municipalities have the choice to pay for integration between independent applications, the cost is usually prohibitive. Additionally, the association of IT applications to a single specific department can be a limiting factor for service offerings. The applications are not flexible to adapt to new needs, therefore the only way currently to have this information reflected in multiple department software is through constant manual transmission and inputting.

BRIEF SUMMARY

A method and system for shared data management in software-as-a-service platform may be provided. The method, in one aspect, may include providing a common object data schema for one or more data objects and one or more data attributes associated with said one or more data objects stored in a master database. The method may also include allowing a plurality of applications to be deployed dynamically on a platform, and receiving registrations from said applications deployed on the platform, the registrations including one or more requests to read or requests to write data values or both, for selected attributes of said one or more data attributes by said plurality of applications. The method may further include enabling said plurality of applications to interoperate by sharing said data values stored in the master database.

A system for shared data management in software-as-a-service platform, in one aspect, may include a common object data schema for one or more data objects and one or more data attributes associated with said one or more data objects. A shared data management server may be operable to publish said common object data schema. The shared data management server may be further operable to allow a plurality of applications to be deployed dynamically on a platform. The shared data management server may be yet further operable to mediate data sharing of data associated with said common object data schema among said plurality of applications.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 12 illustrates another visualization of offers and requests in one embodiment of the present disclosure.

DETAILED DESCRIPTION

Shared data management (SDM) is disclosed in one embodiment that enables platform-mediated data sharing among applications, for example, in Software-as-a-Service platform. Software-as-a-Service or SaaS refers to providing the use of software or application as a service on demand, for instance, by subscription, e.g., in a "pay-as-you-go" model. A customer or a user subscribes for the use of a software application, for instance, as needed by the customer. Typically, an application being provided as a service is resident in a remote platform which a customer may access via a network (e.g., the Internet via a browser or the like interface). The remote platform may include a number of different applications. For instance, a provider of SaaS provides a computing platform and resources for running applications. The applications need not have been developed by the provider, but may have been deployed and set up on the platform by independent software vendors. SDM of the present disclosure provides a common database system, a common data object schema or model, and logic or algorithms for enabling those applications to share data.

Figure 1:
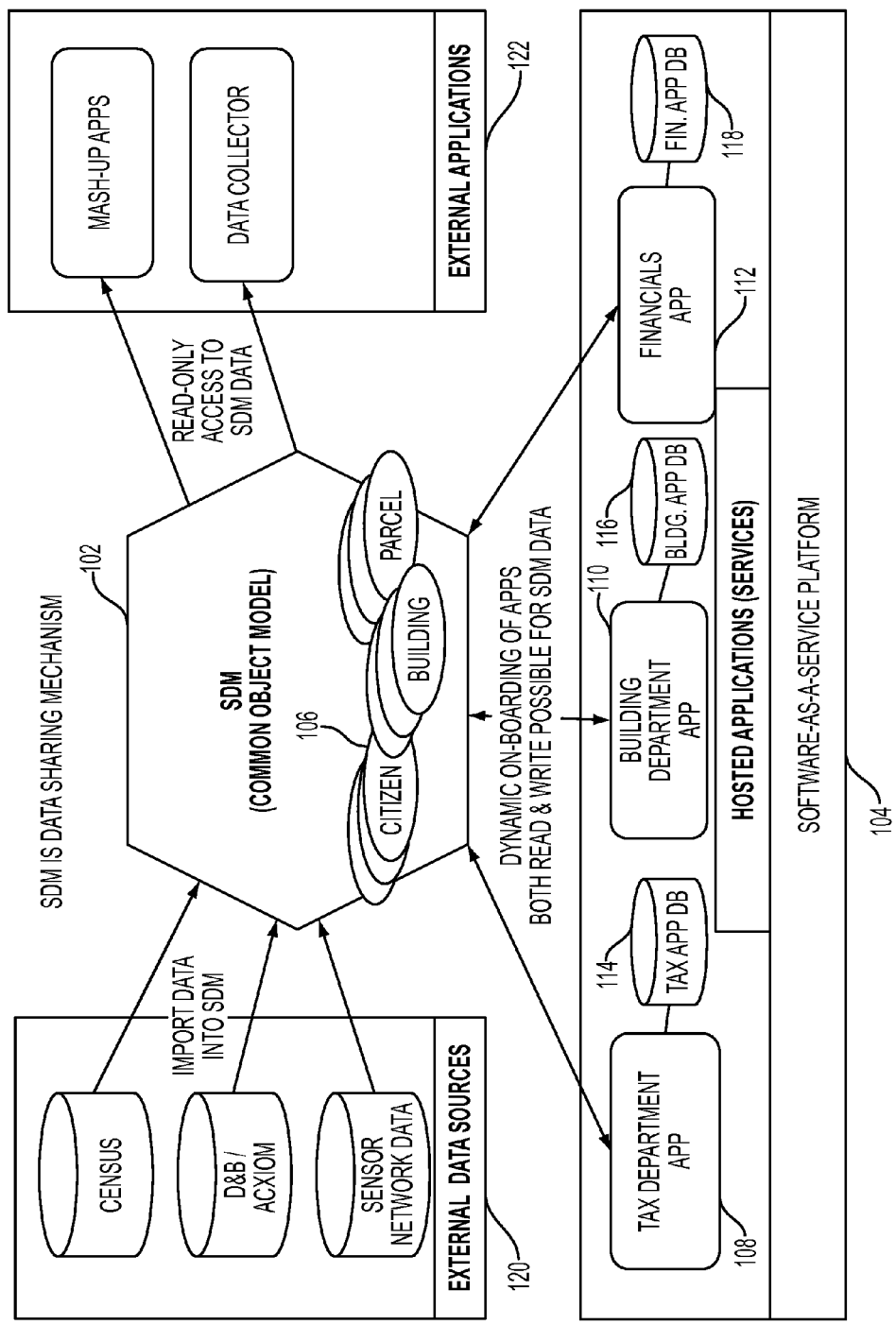
FIG. 1 is a block diagram showing system architecture in one embodiment of the present disclosure.

FIG. 1 is a block diagram showing system architecture in one embodiment of the present disclosure. SDM 102 may include common object model or schema that defines the format for different data attributes 106 for use and sharing among a plurality of applications on a SaaS platform 104. The SaaS platform 104 hosts applications (or services). Take, for example, a SaaS platform 104 that hosts applications used by a municipal government entity. A municipal government entity may employ multiple applications or software as part of its information technology (IT) system, for instance, a tax department application 108, a building department application 110, financials application 112. Each of the application may have and use a separate database (114, 116, 118, respectively) to write and read data needed for the workings of the application. SDM 102 of the present disclosure allows for those applications (e.g., 108, 110, 112) to share the data that may be common to two or more of the applications (e.g., 108, 110, 112).

SDM 102 provides platform-mediated, loosely-coupled linkages between applications, i.e., "service composition" in one or more SaaS platforms. Service composition refers to data sharing. SDM 102 addresses application integration by enabling data sharing of applications (e.g., 108, 110, 112) deployed on the platform 104. SDM 102 also may function as to store and manage high-value shared data for different applications, for example, pertaining to municipal government operations such as land parcels, citizen information, and municipal assets, and others.

The common object schema 106 for data to be stored, for example, in a master database may be generated, for instance, in consultation with the users and developers of the applications. For example, in the case of application used by a municipal government, the municipal government (e.g., users and/or administrators therein) and those who develop the applications (e.g., independent software vendors (ISV) may be consulted to create a common object schema for data used by the government and the applications.

A software interface such as an application program interface (API) allows the ISVs to create services that access shared objects. In this way applications or services (e.g., 108, 110, 112) may be hosted on the SaaS platform 104. In one aspect, each application (e.g., 108, 110, 112) keeps its own private database (e.g., 114, 116, 118 respectively) with mapping of attributes in a master database of the SDM 102 with those in private database.

A user (e.g., an administrator of municipal government) may subscribe to a set of applications hosted on SaaS platform 104. A set of applications that a user subscribes to may be referred to as the "subscription set." The SDM 102 of the present disclosure in one embodiment allows the applications in a subscription set to work cooperatively without being directly aware of each other's presence. For instance, the applications need not directly communicate with each other, hence, the application need not be tightly-coupled. Communications and interactions among applications in a subscription set are mediated by SDM 102, and therefore, the applications are loosely-coupled.

Data Sharing in SDM 102 may be accomplished, for example, by analyzing the data used in the SaaS platform 104 and identifying the data objects commonly used by the applications hosted on the platform 104. For instance, in a municipal government information technology (IT) system, government data systems may be analyzed and data objects common to the government applications may be identified. The identified common data objects used by the applications may be stored and maintained by SDM 102 in a database system, using a generated object schema or model for those objects. In an IT environment (e.g., of one or more municipal governments), it is possible that there may be multiple copies of the same object from one or more applications. Also, there may be conflicting information about the object from different applications that read and/or write values to the object. SDM 102 may store the master copy of the objects (also referred to as authoritative information or data). Thus, SDM 102 may take responsibility for common data, making it easier to create new applications that can use the data and making the platform more sticky, that is, making it easier to keep the applications and their users on the platform.

Common data objects managed by the SDM may be viewed as "Master Data". The data is to be authoritative, e.g., there are no duplicates and/or full auditable history may be made available. Common data objects may be high value information that an organization uses repeatedly across many business processes. The database system used in the SDM to store the common data objects may offer data sharing functionality for SaaS with features such as data stewardship which prevents inadvertent creation of duplicate parties and products, and eliminates any duplicates by using sophisticated matching techniques, point-in-time history which includes a full audit database that contains the full modification histories of all business objects so that rich set of query options are available for the audit database, track source of data which keeps track of the source of all data and when it was added, and rules of visibility which allows administrators to define what elements and sub-elements users and user groups can see based on defined constraints.

Data stewardship refers to the functionality that, for example, allows an administrator to eliminate data errors such as inadvertently created duplicates business objects. The Point-in-time functionality, for example, allows the administrator to view the state of an object at a particular moment in the past. Data source tracking, for example, enables the administrator to identify the specific application that updated an attribute of an object.

An example of a database system may be master data management (MDM) system from International Business Machines Corporation (IBM), Armonk, N.Y. SDM 102 in one embodiment may be implemented with one or more MDM systems.

An MDM system manages master data, for example, manages objects and attributes; defines data governance procedures such as conflict resolution, data import and data integration; defines transactions over the mater data; and defines access control to objects and attributes. An MDM server may ensure consistent master information across transactional and analytical systems; address issues such as data quality and consistency proactively rather than "after the fact" in the data warehouse; decouple master information from individual applications; become a central, application independent resource; and simplify ongoing integration tasks and new application development. An MDM system may be implemented in "consolidation" style in which data is periodically replicated to the MDM server; "registry" style in which the MDM server know where to find the data, e.g., by reference; "transactional hub" style in which MDM server becomes the system of record for master data, for example, for appropriately architected applications.

In one aspect, SaaS 104 may also use the MDM system as a transactional hub so that transactions operate on data stored in the MDM system, for example, as the "Transactional Hub" style implementation of an MDM system, in which MDM system becomes a system of record for master data. Other styles of MDM system may be used. MDM server may provide an integrated, consistent view (and, e.g., "master" copy or master view) of data or selected data which originally reside in applications' private databases. Once the master view is created, one can write new applications which work on the integrated view, e.g., single view of "Citizen" data object.

Additionally, one can configure and "enable" the applications to see the master view of the data. For instance, an application from independent software vendors may be deployed and registered in the SaaS platform 104. The application's data may be registered to MDM system in the platform 104. The platform 104 makes the data available to other applications, which are also registered to the platform (e.g., as sort of a "data marketplace"). The platform 104 configures the application which adopts new data from other applications in the platform. The end user sees and uses the newly configured, extended application from the platform. MDM may be an application running on DB2™, database system from IBM.

MDM database may federate legacy databases so that new applications can query MDM database and see data from several legacy databases. There are several different ways for an MDM system to adopt legacy data. The ways for adopting legacy data are referred to as "architecture styles". Different architecture styles handle the data consistency issue between MDM database and private database differently. For instance, "Registry style" utilizes referencing or pointing, and therefore, data instances are not replicated. "Transaction style" utilizes values or copies of the data, therefore, legacy database may be discarded once the data instances are copied to MDM database and there are no data replications. In "Co-existence style", the legacy application maintains its private data; and the MDM database synchronizes with the legacy databases; the details are left to MDM system implementation. In "Consolidation style", ETL (Extract, Transform & Load) for data analysis with MDM data—the legacy application does not use MDM data for operation and there is no data replication. Extract, transform and load (ETL) is a process in database usage and especially in data warehousing and also in master data management that involves: extracting data from outside sources, transforming it to fit operational and analytical needs (which can include quality levels), and loading it into the end target (master database or data warehouse).

In another embodiment, external data sources may import (write) data into SDM 102. External applications may read data from SDM 102.

Figure 2:
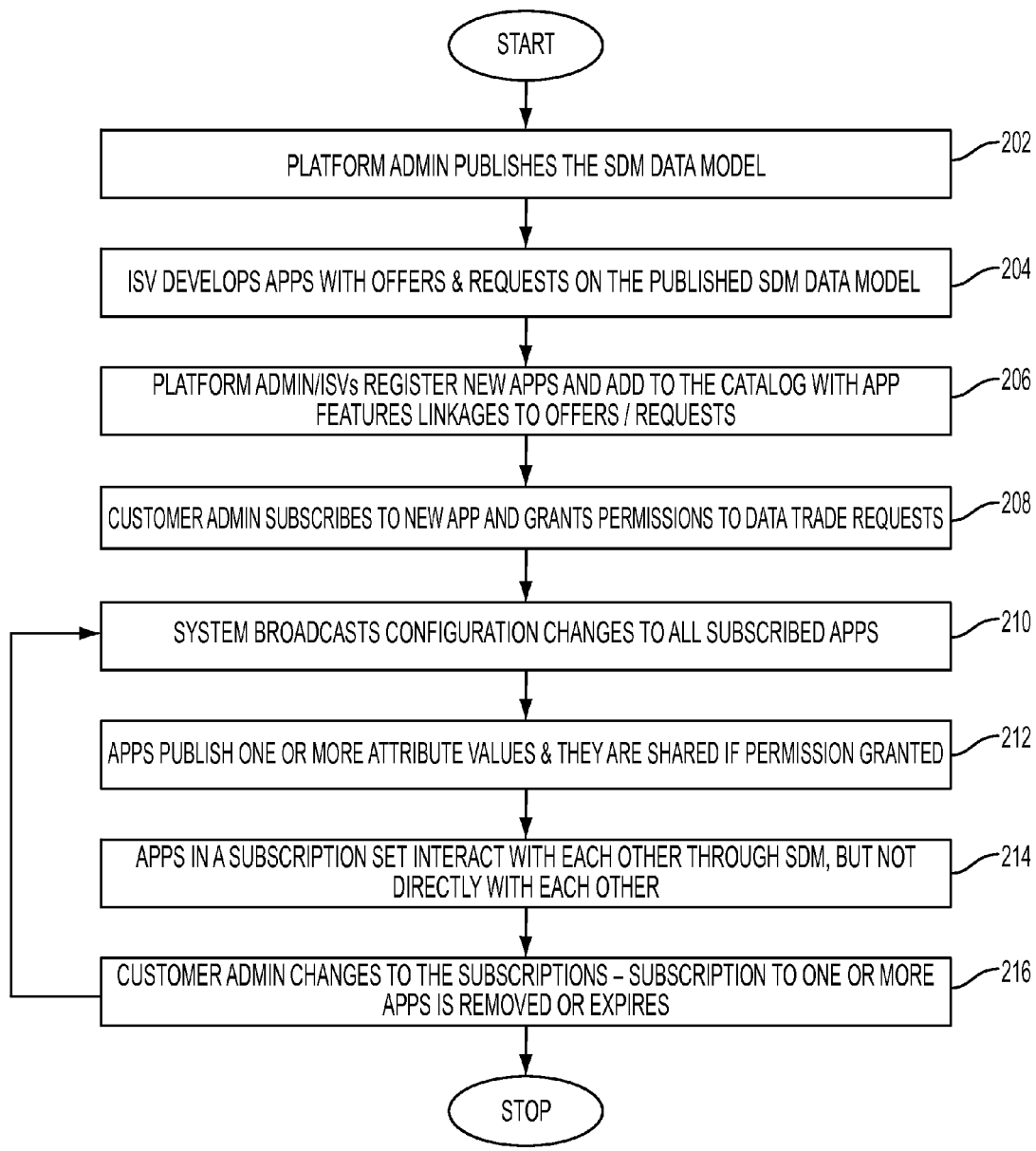
FIG. 2 is a flow diagram illustrating a method of shared data management in one embodiment of the present disclosure.

FIG. 2 is a flow diagram illustrating a method of shared data management in one embodiment of the present disclosure. At 202, SDM data model (e.g., FIG. 1 106) may be published on a SaaS platform. For instance, a platform administrator may publish the data model for applications to view. For example, an interface or API may be made available to display data model and schema, e.g., data structure of data object and attributes. In another aspect, publishing may include sending notifications to the applications. A data model, as described above, refers to data object schema (or data structure format) for managing, storing and maintaining data. At 204, application developers may deploy one or more applications on the SaaS platform, with offers and requests on the published SDM data model. An offer refers to asking for permission to write selected data associated with one or more attributes of the data model to a shared database. A request refers to asking to be able to read or access selected data associated with one or more attributes of the data model from the shared database. For examples, application developer or vendor may study the data object schema (model) and application programming interface (API) published by SDM, then decide which shared objects and attributes will be accessed by the application. Data object schema (model) and application programming interface (API) may be made available through ISV toolkit package. ISV may define the trade for the application. Trade refers to offers and requests. For instance, each object or attribute may be defined with constraints of read or update access. ISV may register the list of trades for the application. In the applications, an action handling mechanism may be provided to enable or disable functions in the application based on the attribute permissions granted.

At 206, new applications may be registered and added to a catalog of applications on the SaaS platform, with application links to offers and/or requests, i.e., which application is offering to write and/or requesting to read which data specified in the SDM data model. An administrator of SaaS platform may add or remove applications from an application catalog. For example, a platform administrator may study the application and approve it for the SaaS platform, for example, if it meets platform requirements. A platform administrator may store the trade for the application in an SDM operational database. In addition, a platform administrator may specify the pricing strategy for the application and add the application to an offering catalog.

In another aspect, a platform administrator may remove an application from the offering catalog. Current subscribers are notified of the application being removed, and all instances of the application may be deleted from all subscribers' subscription sets. In addition, a platform administrator may remove the trade for the application in the SDM operational database.

At 208, a user or customer of the applications (e.g., an IT administrator on the user side or customer side) may subscribe to the use of the applications on the SaaS platform, for example, from a list contained in the offering catalog. A subscribing user may grant permissions to the offers and/or requests. Thus, a user may select applications, decide which application features to use, and define a shared data access policy. A policy may be a high level statement regarding which departments will control the shared objects. Other policies may be specified. The user (e.g., software customer's IT administrator) may designate who will access the application. For instance, if the user is an IT administrator of a municipal government, that IT administrator may designate what users or user groups in the municipal government may access the application. The user (e.g., an IT administrator) may use a tool such as shared data editor to specify shared object permissions. The statuses of permissions (granted or denied) associated with the shared data objects are stored, for example, in an operational database. SDM also may send event notifications (e.g., broadcast) about the new permissions to all trading applications.

Thus, the customer (user of the applications) may add an application to a subscription set. In addition, the customer may remove an application from the subscription set, or modify permissions for applications in the subscription set. Permissions may be granted/denied as follows: accept an attribute update offer; decline an attribute update offer; grant an attribute access request; deny an attribute access request. After permissions are determined by the customer, applications are notified of the permissions. This may occur at any time, for instance, during configuration or deployment of the application, and/or during operation of the application (e.g., when the application is running on the platform to provide its services). During operation of an application, it may update the attribute corresponding to an accepted offer in the SDM. The application may read the attribute value from SDM. If an attribute update offer is declined, the application may not update or write to SDM. In this case, the application's functionality may be modified so that updating or writing of the data associated with the update offer is disabled. Once attribute access (read) request is granted, an application may read from SDM. Once attribute access (read) request is denied, an application may not read that data in SDM associated with the denied request. In one embodiment, the read requests may be either a mandatory read or optional read. That is, if an application needs to read the data associated with the read request in order to perform its functions, the request for that data is considered as mandatory. If an application can function without the data, the read request for that data is considered as optional. In the event that a mandatory request is denied, and for instance, the denied application could not obtain the data other than through the SDM, the application may be in disabled state, since it cannot obtain the data needed to function. Alternatively, the application may run in a different mode without the data. In the event an optional request is denied, the application may still provide its functionalities.

At 210, SDM broadcasts configuration changes to all subscribed applications. If an application is removed from the subscription set, event notification (e.g., broadcast) is sent about the deleted permissions to all trading applications. At 212, applications publish one or more attribute values (data) and they are shared if permission is granted. In this way, at 214, the application in a subscription set may interact with one another through SDM, but not directly with one another. At 216, in response to a user (e.g., user's administrator) changing subscriptions, the subscription to one or more applications is removed. In another aspect, the subscription may be removed in response to the subscription expiring. The removal is broadcast as shown at 210.

Figure 3:
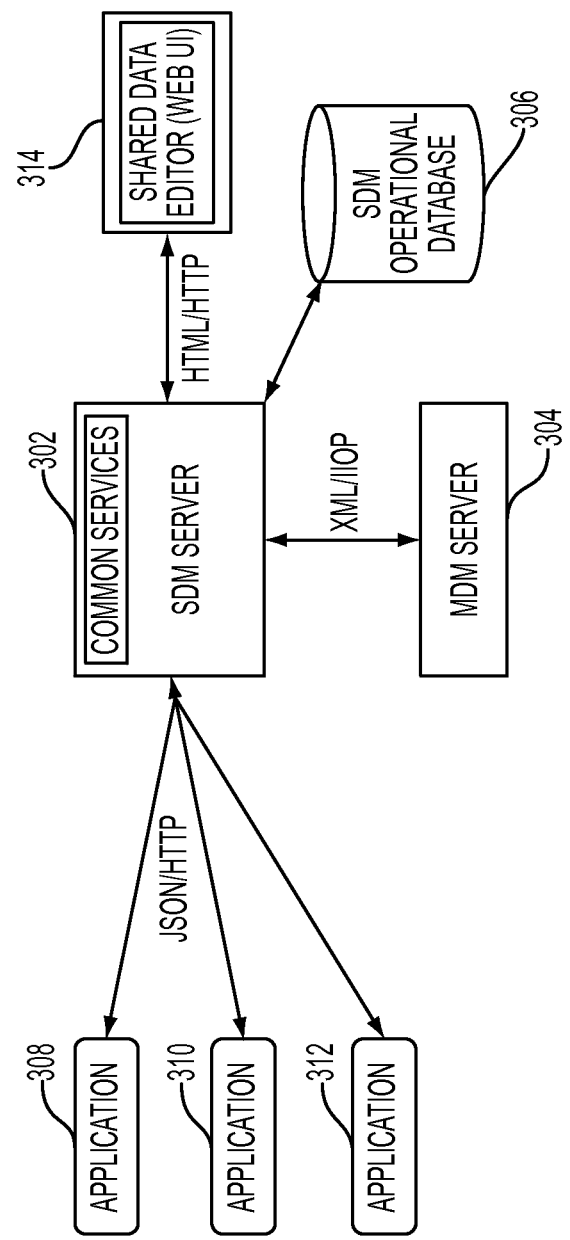
FIG. 3 is a diagram illustrating implementation architecture of shared data management (SDM) in one embodiment of the present disclosure.

FIG. 3 is a diagram illustrating DSM implementation architecture in one embodiment of the present disclosure. In one embodiment SDM 302 may be implemented as a layer on top of IBM MDM Server 304. SDM operational database 306 stores application trades and permissions. Applications 308, 310, 312 communicate with SDM 302 using, for example, an interface. The interface may be implemented as JavaScript Object Notation (JSON)/hypertext transfer protocol (HTTP) REST interface. REST is a Java™ application for web services. SDM 302 may implement a plurality of common services that are related to management of shared data in database server (e.g., 304). SDM 302 also provides an inclusive environment for software developers to dynamically add or deploy applications on a SaaS platform, and thus applications may be cataloged dynamically. Applications (e.g., 308, 310, 312) may collectively update and access a predefined set of data objects in a master database 304 using the data schema defined in SDM 302. An editor application (referred to as Shared Data Editor) 314 may be provided for application developers to make offers and requests, and for users of the applications to grant or deny permissions. The editor application may be a web application that can be used from any browser, and allows for dynamic data trading. Each application may be used independently, but when used in combination, they gain functionality. For example, an application provides a set of functionality, e.g., read and write, for a set of data. So it can read and/or write to data that belongs to this set. However, it cannot read or write to data that does not belong to this set. Suppose additional data becomes available to this application, then this application dynamically adapts to the situation and starts reading and writing to the data that newly becomes available to the application. With the gained functionality, the user interface of the application may be also dynamically modified; for example, a portion might be enabled to allow operations on the newly available data in the interface.

Figure 4:
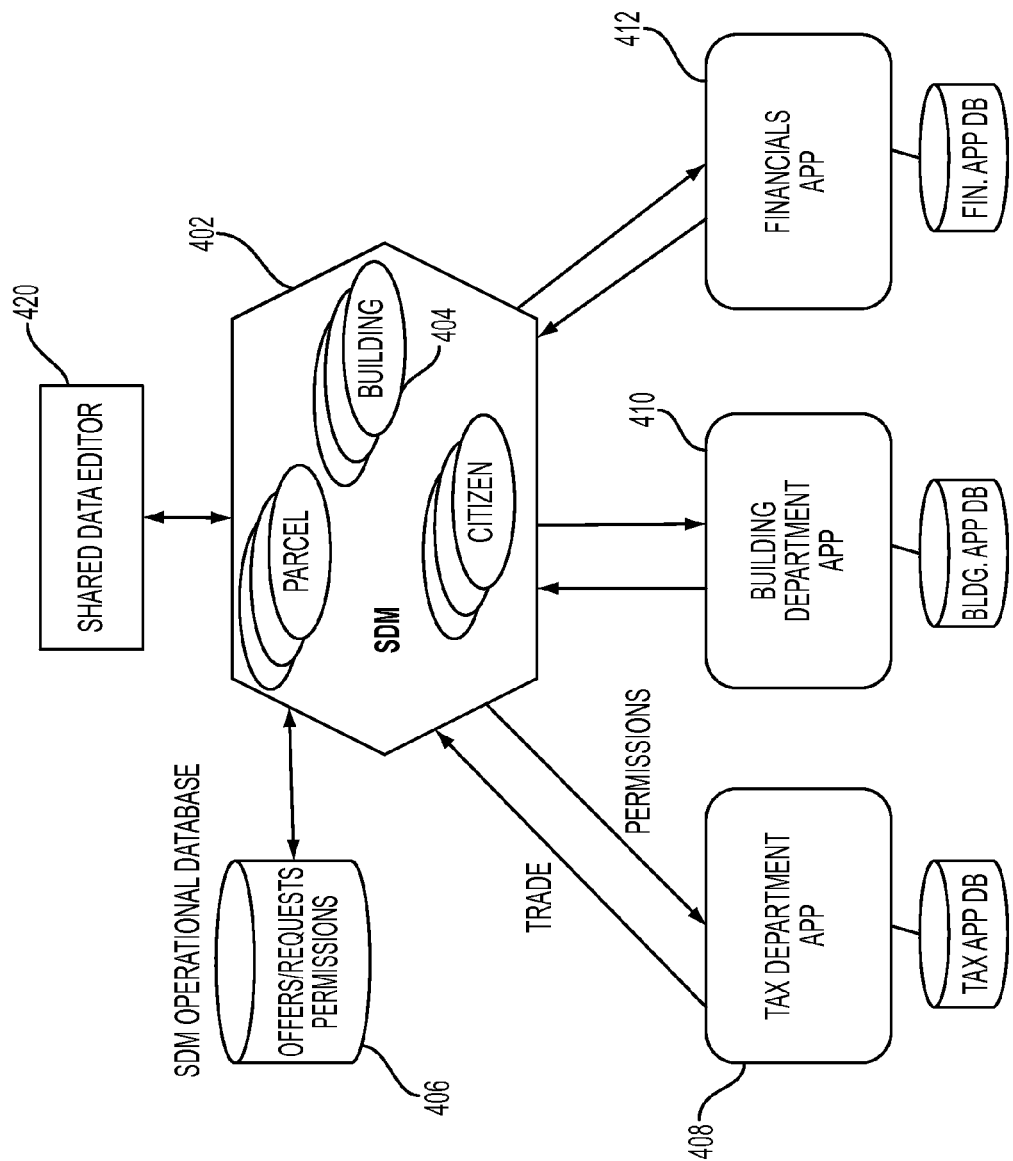
FIG. 4 is a diagram illustrating SDM as a data marketplace in one embodiment of the present disclosure.

FIG. 4 is a diagram illustrating SDM functioning as a data marketplace in one embodiment of the present disclosure. SDM 402 may function as a data marketplace or data broker for dynamic data trading. Applications (e.g., 408, 410, 412) may offer to update attributes of the shared objects 404 in SDM 402. In one embodiment, all offers are optional, i.e., an application has a choice to offer. Applications (e.g., 408, 410, 412) may request read access to the attributes of shared objects 404 in SDM 402. In one embodiment, requests may be designated mandatory or optional. SDM 402 enables data trade among applications. Data trade herein refers to offers and requests specified by applications.

Applications (e.g., 408, 410, 412) send trade requests (i.e., data offers and requests) to SDM 402. The trade requests may be stored in an SDM operational database 406. A user of the applications or the like or an SDM administrator may use a tool, for example, Shared Data Editor 420 to view or otherwise identify trades from selected applications dynamically, and also grant permissions to the applications dynamically. Permissions may be granted to applications, for example, to read, to write, or to both read and write the data specified in the trade. Providing permissions may be automated. In one embodiment, the granted trade requests are stored in SDM operational database 406. SDM 402 notifies applications (e.g., 408, 410, 412) about the permissions set. In response, applications (e.g., 408, 410, 412) may adapt their functionality to match the granted permissions. For example, one or more functions may be disabled if the application is not given access to requested data. SDM 402 notifies applications when requests are no longer viable, e.g., because associated offers are removed or disabled.

Figure 5A:
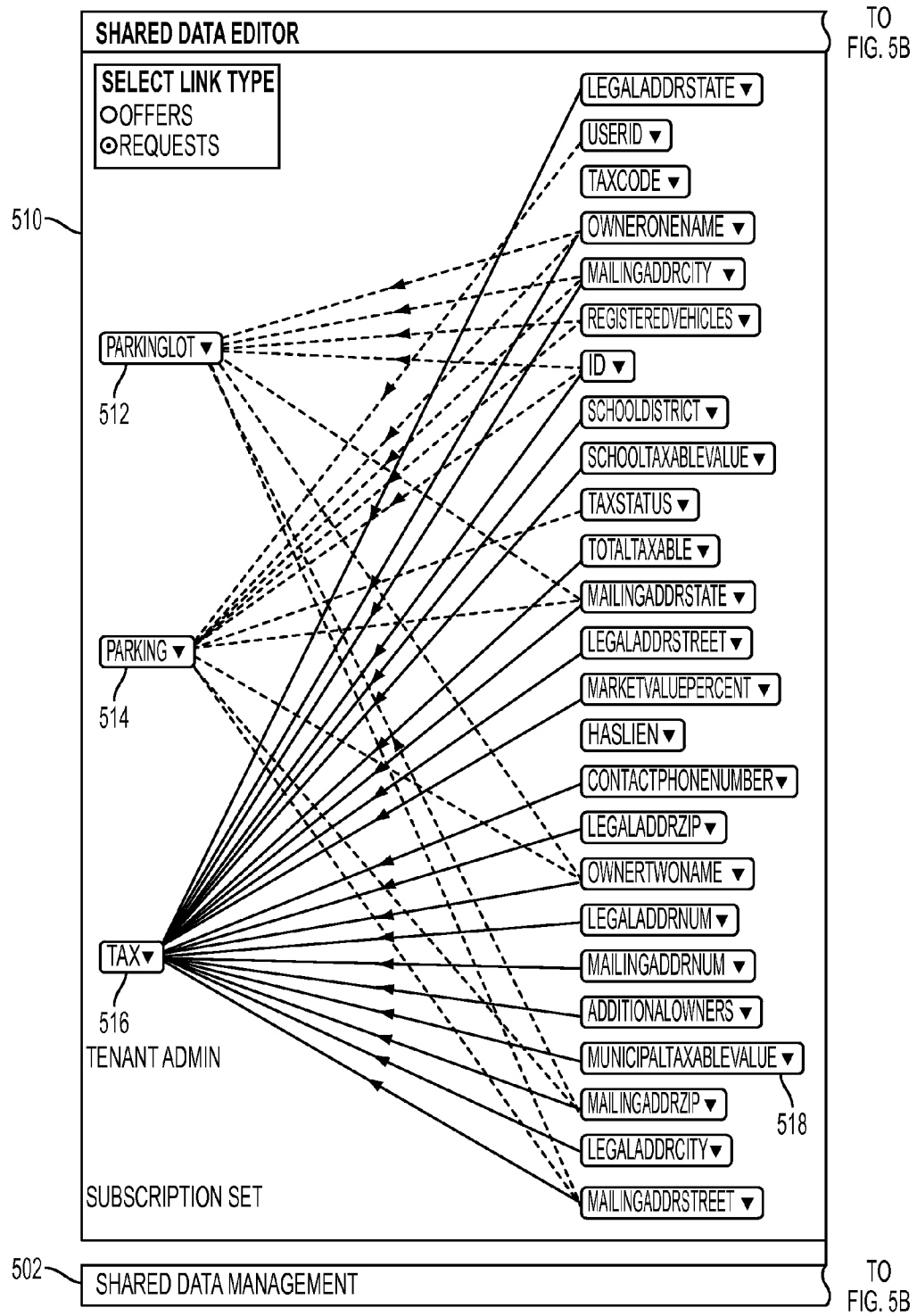
FIG. 5a and FIG. 5b is a diagram showing an example of shared data editor interface in one embodiment of the present disclosure.
Figure 5B:
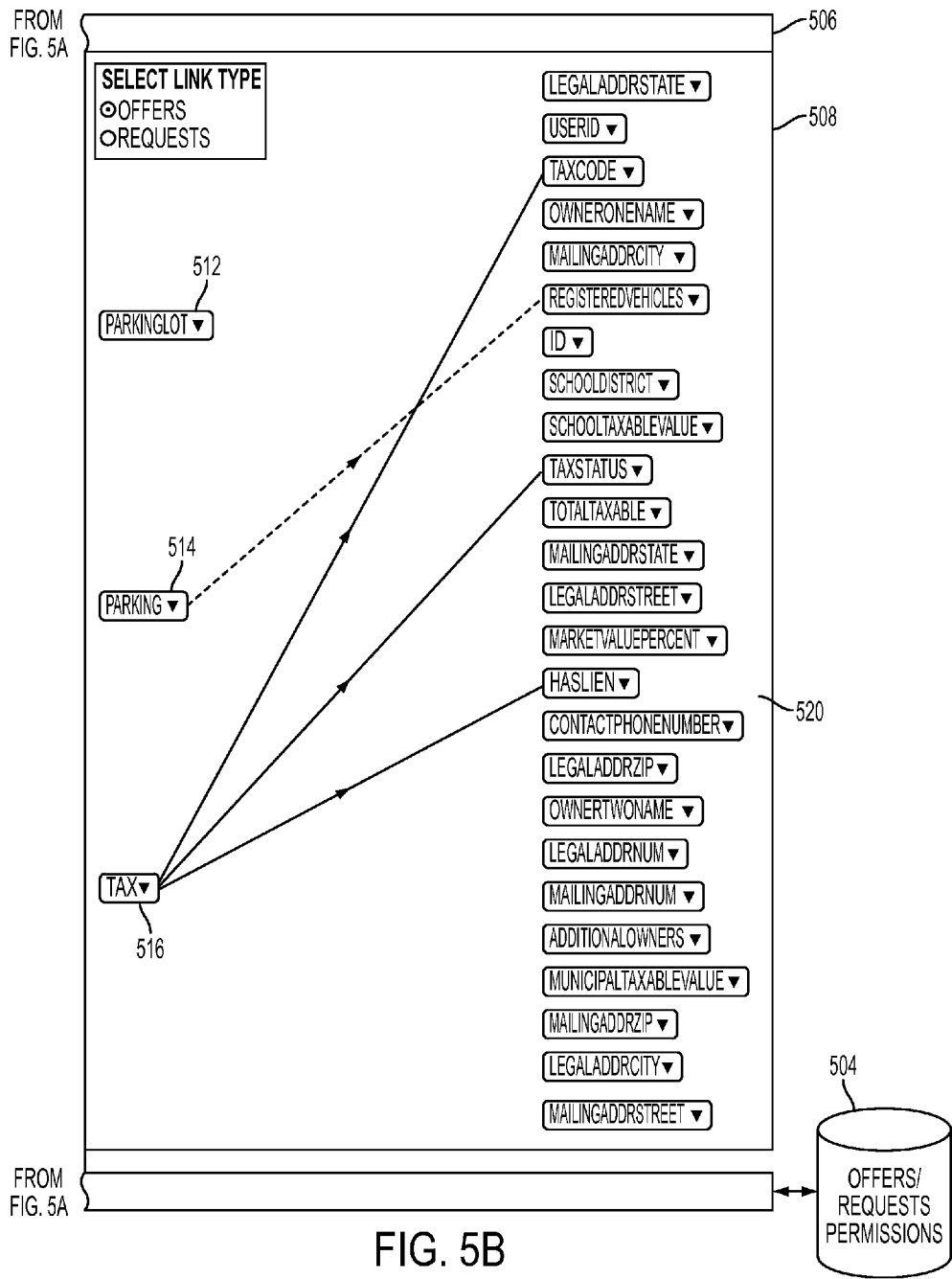

FIG. 5 is a diagram showing an example of shared data editor interface in one embodiment of the present disclosure. Shared data editor 506 may include a user interface, for instance, for requesting data reads 510 and for offering data writes 508. In the example shown in FIG. 5, a subscription set may include applications for parking lot monitor 512, parking 514 and tax 516. A municipal government, for instance, may subscribe to those applications installed or deployed on a SaaS platform. A subscription set may include other applications. The applications 512, 514, 516 (or developers or administrators of those applications) may make requests to read data defined in a data object model 518 using the interface 510. Similar, the applications 512, 514, 516 (or developers or administrators of those applications) may make offers to write to the data defined in the data object model 520 using the interface 508. For instance, a parking lot monitor application developer or administrator or the like may select the "parking lot monitor" application button and then select one or more data objects in the data object model. The editor 506 shows the requests and offers by dotted lines. A subscriber (e.g., a municipal government IT administrator) may view or otherwise identify the data requests and offers by the applications on the editor 506 (e.g., the dotted lines on the interfaces 508, 510 show which applications have made requests and/or offers). The subscriber then may grant or deny those request and/or offers, for example, by clicking on those links. The editor 506 may show the granted permissions by solid lines (e.g., once granted, the dotted lines change to solid lines). The editor 506 communicates the granted permissions to SDM 502, and SDM 502 stores the granted/denied permissions in a database or storage 504.

Figure 6:
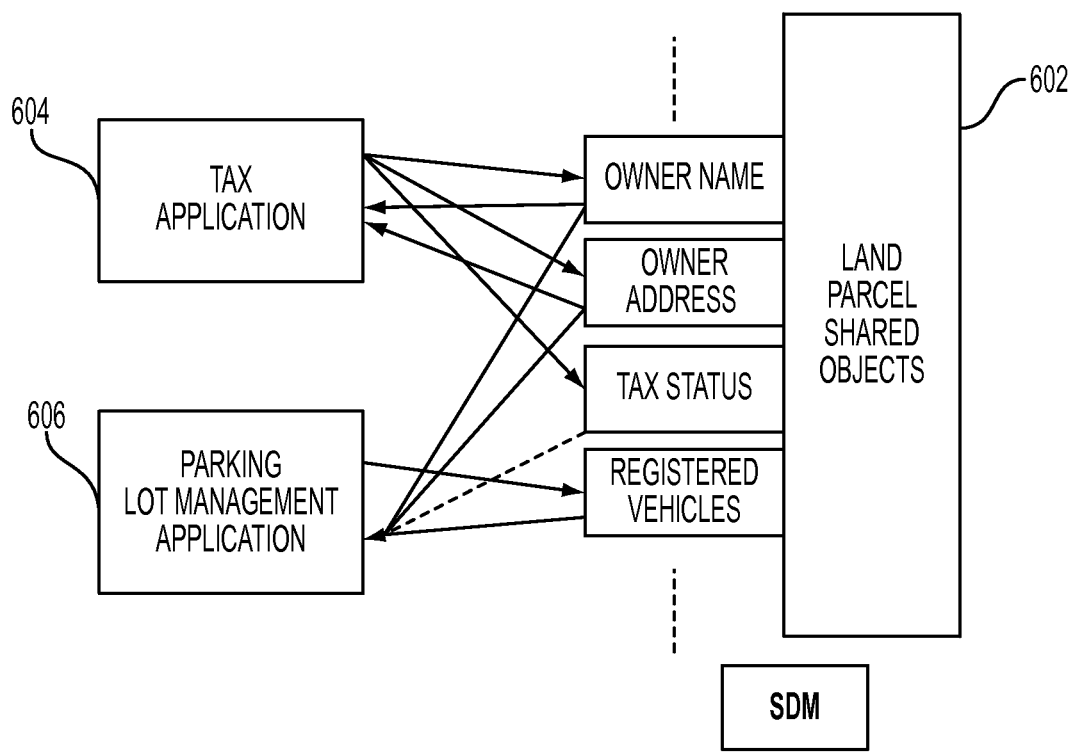
FIG. 6 shows examples of data objects in shared data management (SDM) in one embodiment of the present disclosure.

FIG. 6 shows examples of data objects in shared data management (SDM) in one embodiment of the present disclosure. Examples of data objects may include data associated with land parcel that describe basic unit of land and accompanying structures managed by municipal government. Such data may be used by various applications, for example, employed by municipal governments. Land parcel shared objects 602 may include data such as parcel identifier (ID) such section-block-lot (SBL) number, owner name, owner address, tax status such as whether current or delinquent, registered vehicles such as a list of vehicles associated with this parcel, and others. The data may be used by one or more applications, for example, tax application 604 and parking lot management application 606.

A tax application 604, for example, may keep track of tax bills and payments and needs mandatory read access to ID, Owner Name, and Owner address. All read requests may be mandatory and if denied, application may not be able to function. A tax application 604 may send an offer to update Tax Status object in the land parcel shared objects 602. In one embodiment, all update offers may be optional. In one aspect, even if offer is not accepted, application may be able to function since for instance, each application has its own database.

A parking lot management application 606 may be used to manage parking permits for town-owned parking lots. This application 606 may require optional read access to Tax Status and mandatory read access to parcel ID, Owner Name and Owner Address. If the read request is granted, Tax Status may be used to deny parking permits to delinquent residents. If not granted, the application still may operate without the data. This application may also offer to update Registered Vehicles object in the land parcel shared objects 602. The value of this attribute may be useful for other applications as well.

Figure 7:
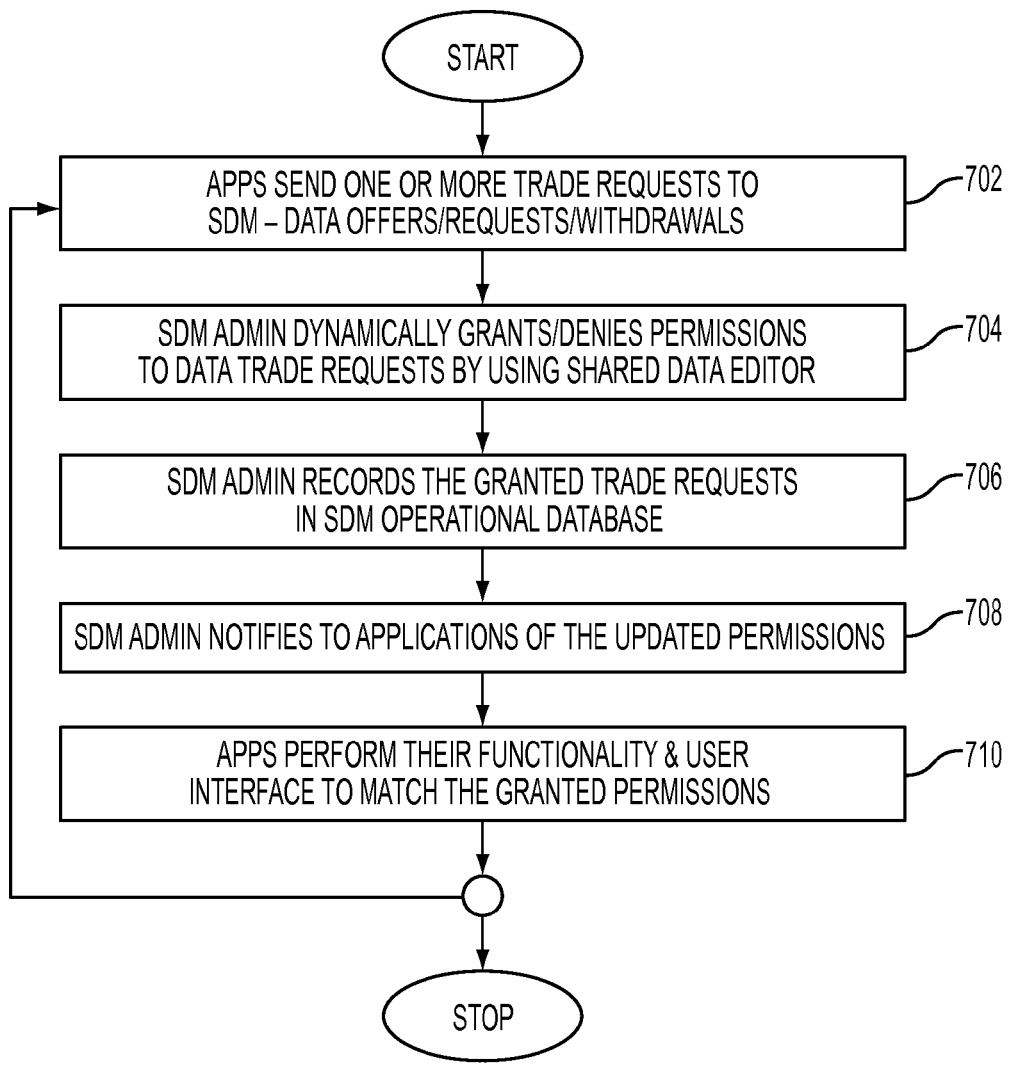
FIG. 7 is a flow diagram illustrating a method of dynamic data trading among applications in one embodiment vie the SDM of the present disclosure.

FIG. 7 is a flow diagram illustrating a method of dynamic data trading among applications in one embodiment vie the SDM of the present disclosure. At 702, one or more applications send trade requests to SDM, trade requests may be offers (offer to update specified data), requests (requests to read specified data) and/or withdrawals (request to withdraw from offer or request). Such trade requests may be made by the applications using a shared data editor and its interface (e.g., shown in FIG. 5). The requests may be made graphically by selecting the data objects. At 704, SDM receives the trade requests and dynamically may grant or deny permissions to data trade requests, for instance, also via the shared editor. An SDM administrator may view the trade requests via the shared data editor and grant/deny permissions via the shared data editor. In another embodiment, this step may be fully automated. At 706, SDM records the granted trade requests in SDM operational database. At 708, SDM notifies the application of the updated permissions. At 710, applications run their functions according to the granted permission.

In one embodiment, there may be a plurality of user groups using the SDM of the present disclosure. For example, a platform administrator may design and publish shared object schema of SDM on SaaS, and maintain the application catalog. An independent software vendor (ISV) may create applications that access SDM and deploy on the SaaS. A customer (user) may subscribe to those applications.

The SDM on SaaS may also include a plurality of user interfaces. For example, a platform administrator user interfaces may be provided to manage the application catalog, for example, add, update and remove ISV applications in an integrated catalog. ISV user interfaces may be provided for submitting application to the catalog, providing application user interface and taking input from user and storing data in private databases. Customer business manager user interfaces may be provided to allow users to search for list of applications deployed on SaaS, e.g., with description of those applications. Customer IT administrator user interfaces may be provided for a user to configure application permissions to shared data, and to manage users, groups and roles. In addition, each application deployed on SaaS may include its own user interface.

An ISV thus may develop and register applications on SaaS. A platform administrator may add new application to a catalog and remove applications from the catalog. A customer IT administrator may add an application to a subscription set, remove an application from the subscription set, modify permissions for applications in the subscription set. The applications in the subscription set may interact by sharing the data in SDM according to the permissions.

Figure 8:
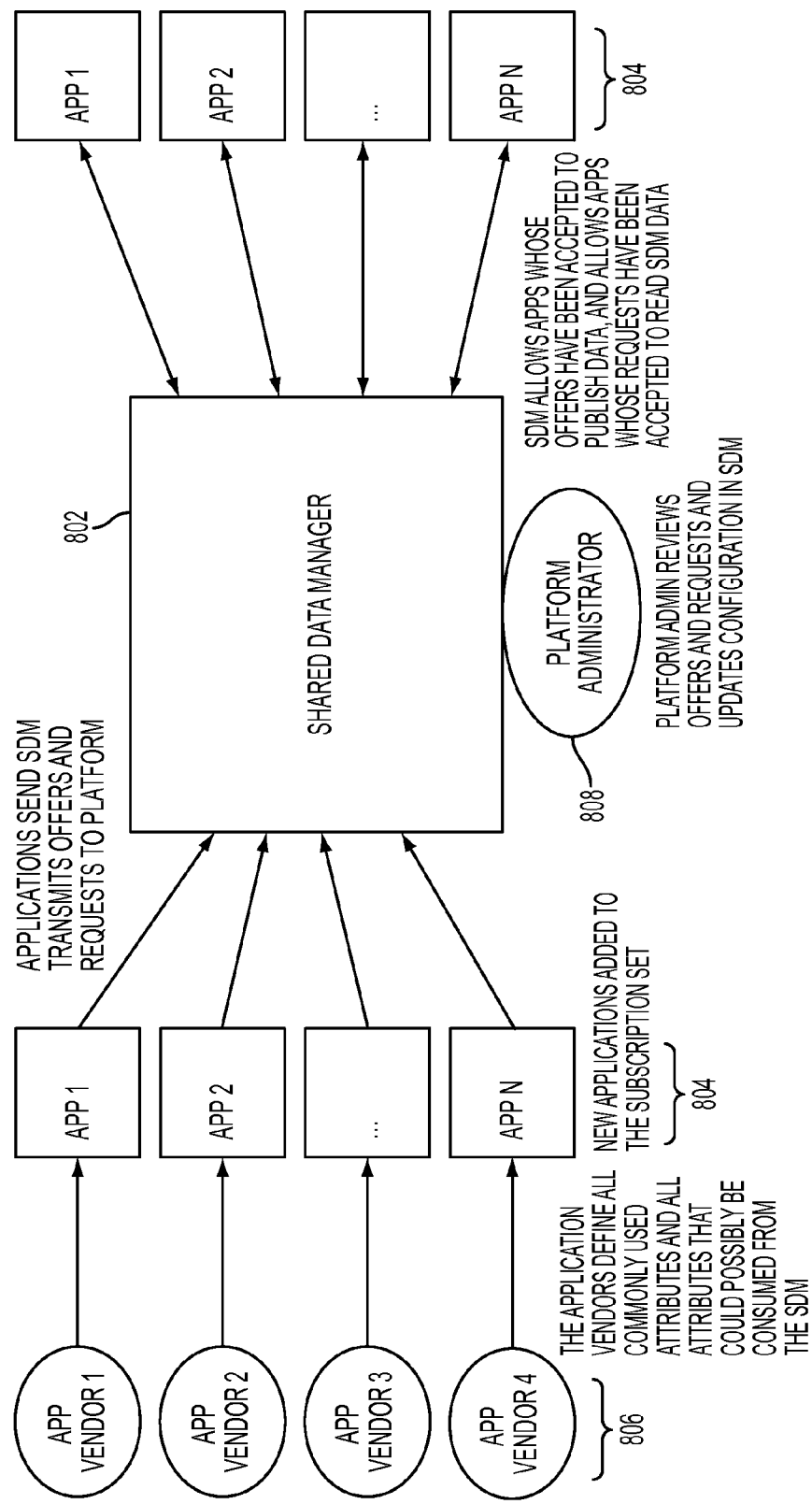
FIG. 8 is a diagram illustrating shared data management in one embodiment of the present disclosure.

FIG. 8 is a diagram illustrating shared data management in one embodiment of the present disclosure. In one embodiment, all possible shared object attributes that an application may request are specified when the application is developed. The application vendors 806 may specify all commonly used attributes and all attributes that could be consumed from the SDM 802 by their applications 804, respectively. New applications 804 are then added to the subscription set. The applications 804 send to SDM 802 offers and request. A platform administrator 808 reviews the offers and requests, and updates configuration in SDM 802. SDM 802 allows those applications whose offers have been accepted to publish or update data, and allows applications whose requests have been accepted to read SDM data.

Figure 9:
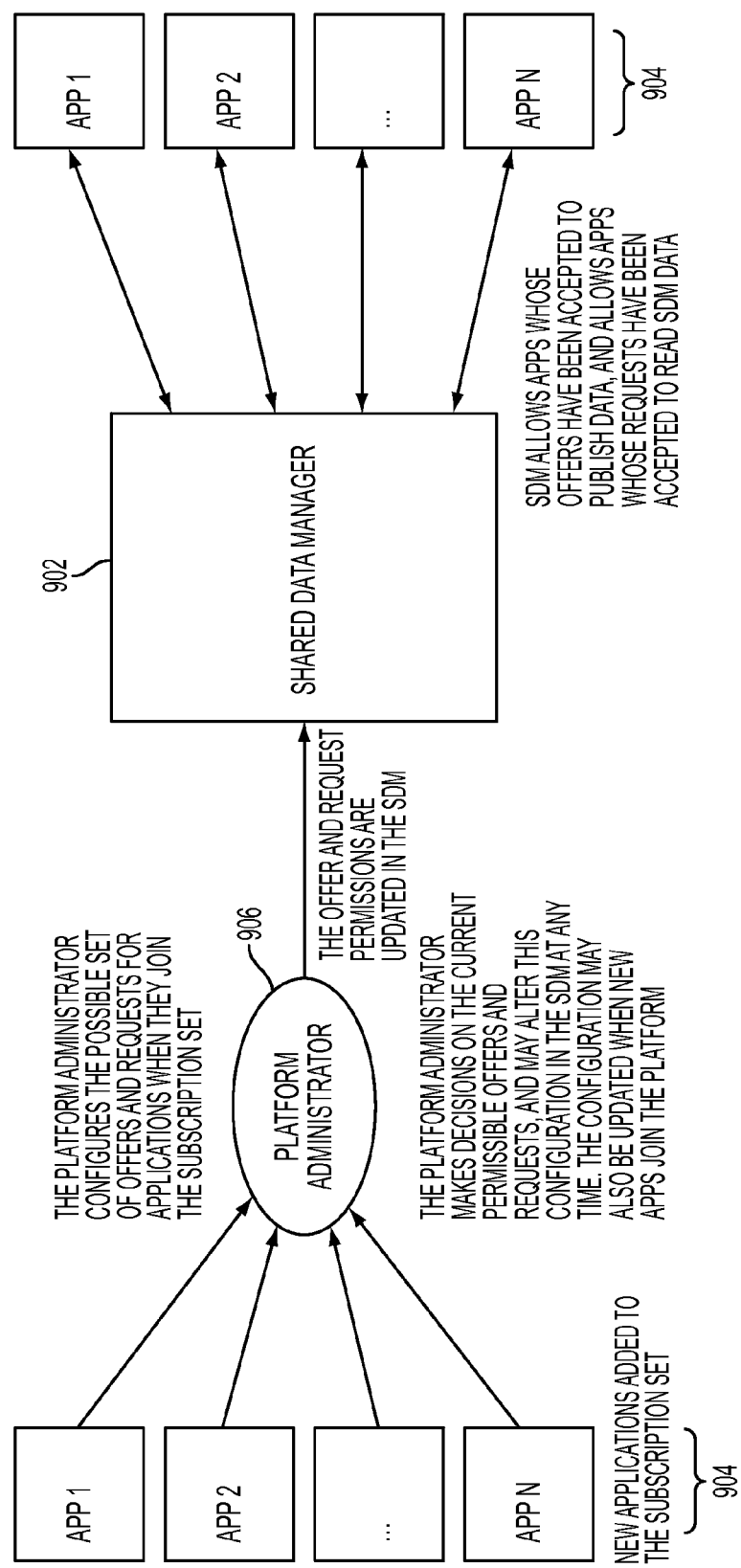
FIG. 9 is a diagram illustrating shared data management in another embodiment of the present disclosure.

FIG. 9 is a diagram illustrating shared data management in another embodiment of the present disclosure. In this embodiment, when applications 904 join the subscription set, a platform administrator 906 determines the full list of possible offers and request, and then configures the permissions based on the current needs of the organization. For instance, new applications 904 are added to the subscription set. The platform administrator 906 configures the possible set of offers and requests for applications 904 when they join the subscription set. The platform administrator 906 makes decisions on the current permissible offers and requests, and may alter this configuration in the SDM 902 at any time. The configuration may also be updated when new applications join the platform. Updates are made to SDM 902. SDM 902 allows applications 904 whose offers have been accepted to update permitted shared object attributes, and allows applications 904 whose requests have been accepted to read SDM 902 data.

In one embodiment, event handling mechanism may be provided that uses event listener/handler, for instance, instead of applications providing APIs. An event listener template may be provided as a part of an ISV toolkit to participate in the event sharing mechanism. Applications may be developed to adapt to the configuration changes in the shared data attributes. Applications may enable/disable data updating or publishing based on the function a customer selects to use or not use. Applications may enable/disable functions based on the status of a subscribed attribute. Applications may enable/disable functions based on the status of the access permission. Event listener may have a filter function to listen to only the changes in the subscribed attributes. Types of configuration changing events may include availability of an attribute (status of publishing) and changes in the permission status of a specific application (allowed to read or write or not, change in composition). Any configuration changes may result in new event generation to all subscribed listener. In one embodiment, a publisher does not need to have the event listener. Changes to schema may be notified to ISVs and an ISV may decide if the ISV should modify applications to support the new attributes or not.

In another aspect, event broadcasting may be utilized. Frequency of broadcasting configuration changes may be tuned based on the behavior of a system (e.g., number of attributes used, frequency of trading, frequency of changes in the composition, and others).

Figure 10:
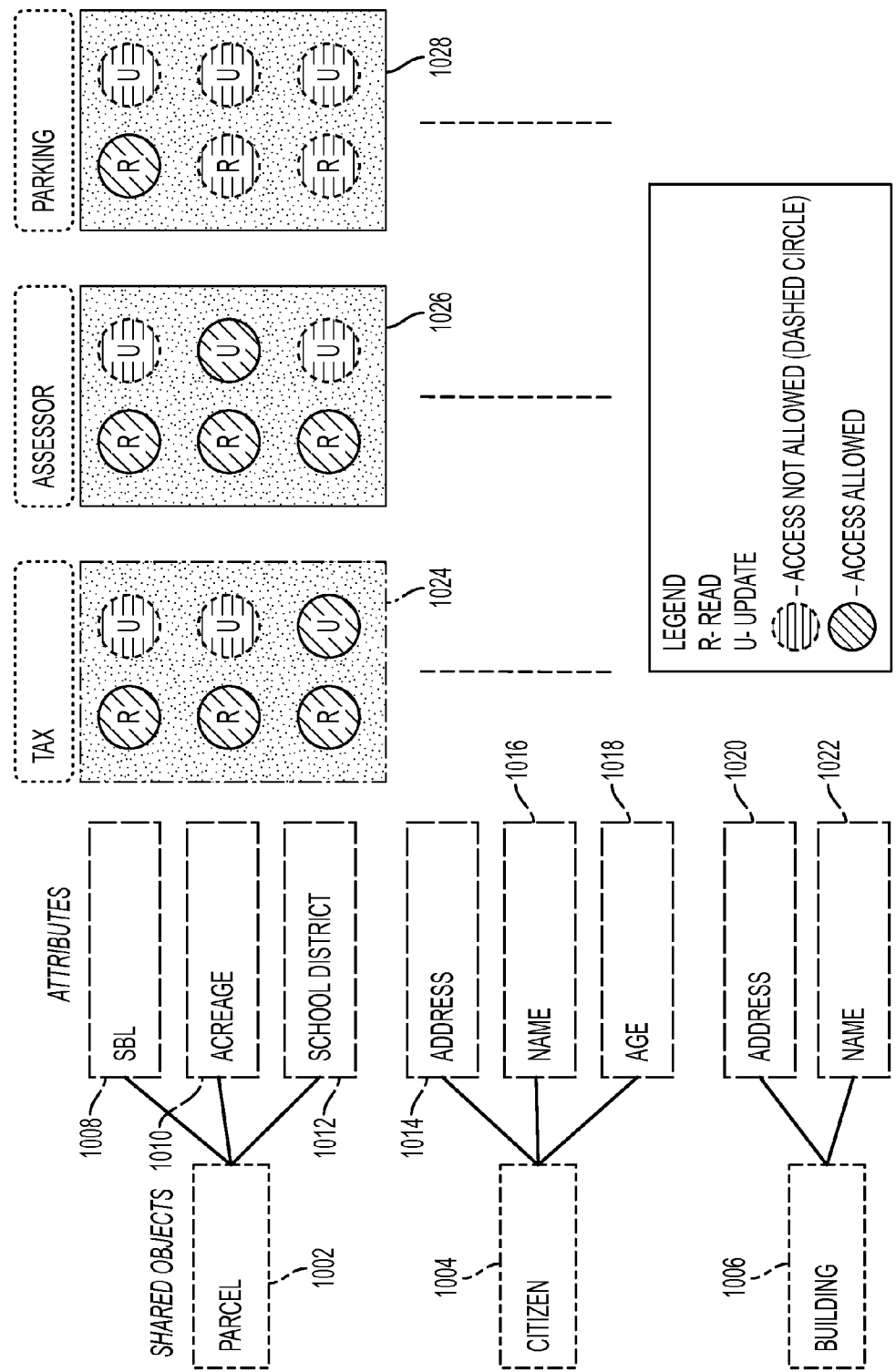
FIG. 10 is a diagram illustrating data permission architecture in one embodiment of the present disclosure.

FIG. 10 is a diagram illustrating data permission architecture in one embodiment of the present disclosure. For example, shared objects may include parcel object 1002, citizen object 1004 and building object 1006. The parcel object 1002 may have attributes such as SBL 1008, acreage 1010, and school district 1012. The citizen object 1004 may include attributes such as address 1014, name 1016, and age 1018. The building object 1006 may include attributes such as address 1020 and name 1022. A subscription set may include applications, for example, tax application 1024, assessor application 1026, and parking application 1028. Each application may have its permissions as established according to the method and/or system of the present disclosure. For example, applications 1024, 1026, 1028 may have sent to SDM, requests (for read) and offers (to write or update data) for specific data objects or attributes of data objects, shown as R and U, respectively. The applications 1024, 1026, 1028 may have been granted or denied those requests and offers, for instance as shown as solid circle or dotted circle.

Figure 11:
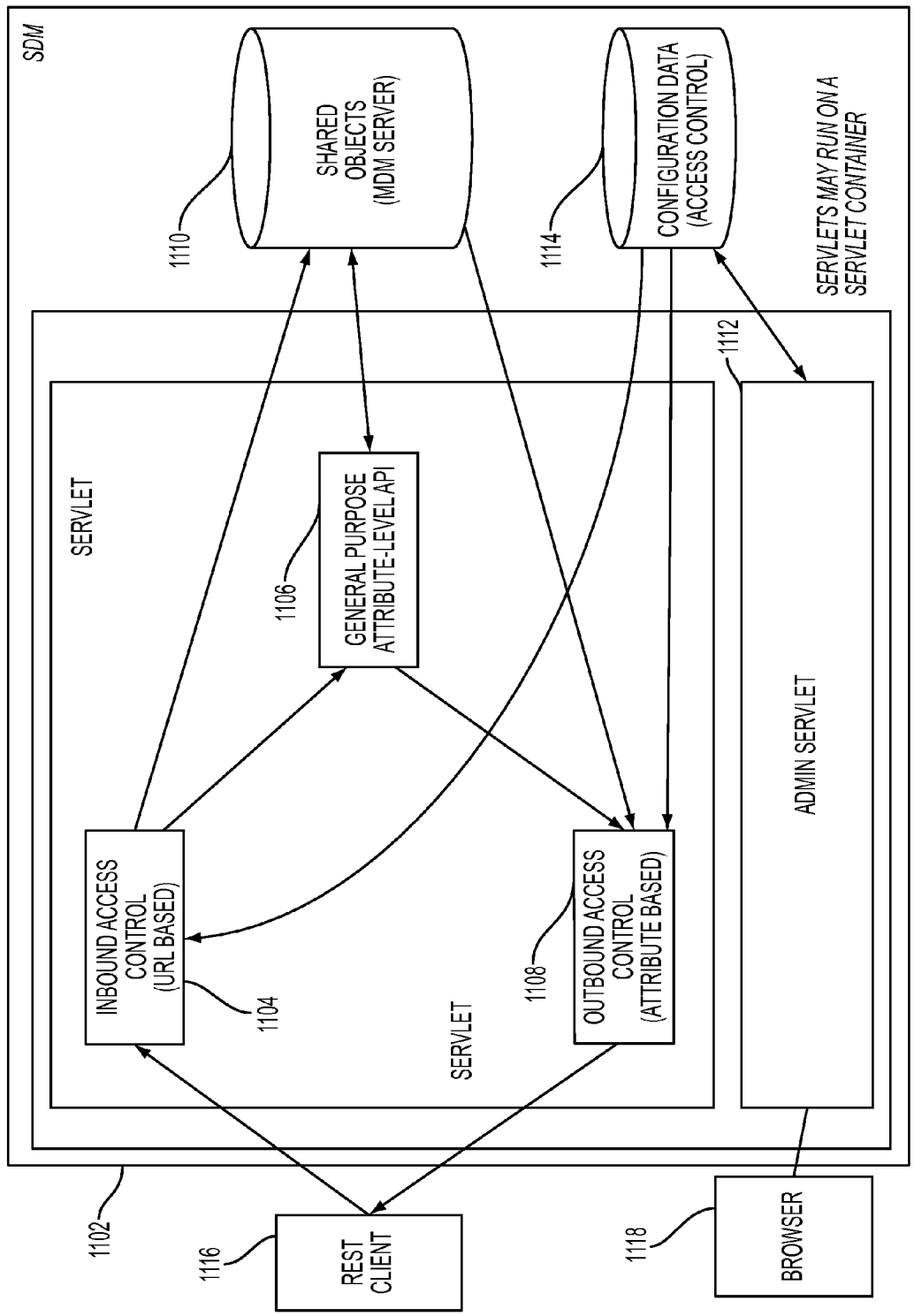
FIG. 11 is a diagram illustrating operating components of SDM in one embodiment of the present disclosure.

FIG. 11 is a diagram illustrating an operation of SDM in one embodiment of the present disclosure. SDM 1102 may include an inbound access control module 1104 that manages security on data coming into SDM 1102. In one embodiment of the present disclosure, an inbound security may be based on uniform resource location (URL) and hypertext transfer protocol (HTTP) verb specified in the request. Types of client requests that SDM 1102 may handle may include pass-through type in which SDM 1102 simply forwards these requests to a database 1110 for processing. Another type of client requests may include SDM API in which the SDM 1102 offers convenience methods to application developers. An attribute-level API 1106 allows an application to update a single shared object (data). The API may be used with POST verb. Payload may be specified as a JavaScript Object Notation (JSON) object that contains a shared object. Briefly, JSON is a text-based data-interchange format. The ability to actually update fields (attributes) is governed by object permissions, for example, stored in configuration database or operational database 1114. In one embodiment, access permissions may apply to shared objects as well as to database views and API method output. Outbound access control module 1108 may be attribute-based and allows applications access to the data attributes stored in database 1110 according to the permission configuration in database 1114. In one aspect, a client interface such as REST client interface may be utilized to interface an application developer or vendor to SDM 1102. REST is a Java™ application that functions with web services. Another client interface (e.g., a web browser) may be utilized for an SDM administrator (e.g., SaaS platform administrator) to grant, deny, change permissions 1114 via a module, for example, a servlet 1112.

FIG. 12 illustrates another visualization of offers and requests in one embodiment of the present disclosure. Applications 1204 may make offers (ask for permission to write or update) for one or more data objects or attributes of data objects 1202. For example, a tax application offers for "tax status" attribute and "assessed value" attribute of a parcel shared object. A parking application may make an offer for "registered vehicles" attribute. Similarly, a tax application may make requests (ask for permission to read) for "tax status", "address", "assessed value", "geo coordinates" attributes of the parcel shared object. A parking lot monitor application may make a request for "registered vehicles" attribute. A parking application may make requests for "tax status", "geo coordinates" and "registered vehicles" attributes. Those applications are then granted or denied permission. If permission is denied to a mandatory request, the application will not be able to function. For example, if the application needs that data to be able to function and does not get it, the application may not be able to function. If permission is denied to an optional request, the application may still be able to function, although with reduced functionality. In one embodiment, all update offers are optional; applications may continue to function whether or not an update offer is accepted.

In another aspect, the SaaS platform may be implemented as cloud computing paradigm, although not limited to only the cloud implementation. Cloud computing is internet-based computing in which shared resources, software, and information are provided to computers and other devices on demand. As such, cloud computing represents a paradigm shift in which the details of IT operation are abstracted from the users. The users no longer need to understand all details of IT architecture—they can access and use sophisticated services with a Web browser and an Internet connection.

For example, a SaaS platform with SDM may run on a cloud infrastructure; the applications provided by independent service vendors (ISV) that can reside within or external to the cloud. Any entity (e.g., local government) may register as a client and enables simple subscription to a rich set of application-based services without building its own IT infrastructure. Actors/players in this system may include the creator and operator of the platform; independent Service Vendors (ISVs) as the creator and manager of the software applications running on the platform; Clients, i.e. municipal governments, who choose to subscribe to application bundles; and Client Relation Owners (CROs) as the coordinator of the business requirements between clients and the platform owners, including identifying clients wanting to subscribe to the platform and enabling selection of ISV software by participating clients. In such as way, for example, service delivery capability may be provided with basic services that offer scalable and secure solutions for the entities while reducing the operation cost and with data synchronization services that help synchronize data elements among multiple services (applications).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for shared data management in software-as-a-service platform, comprising:
    providing a common object data schema for one or more data objects and one or more data attributes associated with said one or more data objects stored in a master database;
    allowing a plurality of applications to be deployed dynamically on the software-as-a-service platform, the plurality of applications being hosted applications whose functions are provided remotely as a service on-demand;
    receiving registrations from said applications deployed on the platform, the registrations including one or more requests to read or requests to write data values or both, for said one or more data attributes by said plurality of applications, said one or more data attributes used in providing the functions of said applications; and
    allowing said plurality of applications to interoperate by sharing said data values stored in the master database,
    wherein each of the plurality of applications keeps a private database with mapping of said one or more attributes in the master database with those associated with the private database.

2. The method of claim 1, further including:
    enabling dynamic data trading among said plurality of applications by allowing said plurality of applications to dynamically request to read or write said data values or both, and by dynamically granting or denying permissions to said request to read or write.

3. The method of claim 2, further including:
    notifying of said granted or denied permissions to all applications in a subscription set deployed on the platform.

4. The method of claim 2, further including receiving dynamically one or more requests to withdraw said request to read or write.

5. The method of claim 2, further including dynamically removing one or more of said plurality of applications, wherein said dynamically granted or denied permissions are also removed.

6. The method of claim 1, further including keeping a catalog of said plurality of applications deployed dynamically on the platform, wherein a subscriber is enabled to select one or more applications to subscribe and create a subscription set.

7. The method of claim 1, wherein the step of allowing said plurality of applications to interoperate by sharing said data values stored in the master database includes enabling said plurality of applications to interoperate by sharing said data values stored in the master database, without said applications being directly aware of one other's presence.

8. A system for shared data management in software-as-a-service platform, comprising:
a common object data schema for one or more data objects and one or more data attributes associated with said one or more data objects;
a shared data management server operable to publish said common object data schema, the shared data management server further operable to allow a plurality of applications to be deployed dynamically on the software-as-a-service platform, the plurality of applications being hosted applications whose functions are provided remotely as a service on-demand, the shared data management server further operable to mediate data sharing of data associated with said common object data schema among said plurality of applications, wherein the plurality of applications use the data associated with said common object data schema in providing the functions of the plurality of applications,
wherein each of the plurality of applications keeps a private database with mapping of said one or more attributes in a master database with those associated with the private database.

9. The system of claim 8, further including:
an editor operable to enable said plurality of applications to dynamically request to read or write or both of data associated with said object data schema, the editor further operable to enable granting or denying of said request to read or write dynamically.

10. The system of claim 9, further including:
an operational database for storing statuses of said granting or denying of said request to read or write.

11. The system of claim 10, further including a master database for storing data associated with said common data object schema.

12. The system of claim 11, wherein the shared data management server notifies said granting and denying of said request to read or write to all applications.

13. The system of claim 8, wherein the shared data management server allows dynamically adding or removing of said applications on the platform.

14. The system of claim 13, wherein in response to an application being removed, all write and read permission associated with said application being removed are also removed.

15. The system of claim 8, wherein the shared data management server keeps a catalog of said plurality of applications deployed dynamically on the platform, wherein a subscriber is enabled to select one or more applications to subscribe and create a subscription set.

16. The system of claim 8, wherein said plurality of application interoperate by sharing said data, without said applications being directly aware of one other's presence.

17. A non-transitory computer readable storage medium storing a program of instructions executable by a machine to perform a method of shared data management in software-as-a-service platform, comprising:
providing a common object data schema for one or more data objects and one or more data attributes associated with said one or more data objects stored in a master database;
allowing a plurality of applications to be deployed dynamically on the software-as-a-service platform, the plurality of applications being hosted applications whose functions are provided remotely as a service on-demand;
receiving registrations from said applications deployed on the platform, the registrations including one or more requests to read or requests to write data values or both, for said one or more data attributes by said plurality of applications, said one or more data attributes used in providing the functions of said applications; and
allowing said plurality of applications to interoperate by sharing said data values stored in the master database,
wherein each of the plurality of applications keeps a private database with mapping of said one or more attributes in the master database with those associated with the private database.

18. The non-transitory computer readable storage medium of claim 17, further including:
enabling dynamic data trading among said plurality of applications by allowing said plurality of applications to dynamically request to read or write said data values or both, and by dynamically granting or denying permissions to said request to read or write.

19. The non-transitory computer readable storage medium of claim 18, further including:
notifying said granted or denied permissions to all applications in a subscription set deployed on the platform.

20. The non-transitory computer readable storage medium of claim 18, further including receiving dynamically one or more requests to withdraw said request to read or write.

21. The non-transitory computer readable storage medium of claim 18, further including dynamically removing one or more of said plurality of applications, wherein said dynamically granted or denied permissions are also removed.

22. The non-transitory computer readable storage medium of claim 17, further including keeping a catalog of said plurality of applications deployed dynamically on the platform, wherein a subscriber is enabled to select one or more applications to subscribe and create a subscription set.

23. The non-transitory computer readable storage medium of claim 17, wherein the allowing said plurality of applications to interoperate by sharing said data values stored in the master database includes enabling said plurality of applications to interoperate by sharing said data values stored in the master database, without said applications being directly aware of one other's presence.

* * * * *